United States Patent [19]

Ray

[11] Patent Number: 5,257,286
[45] Date of Patent: Oct. 26, 1993

[54] HIGH FREQUENCY RECEIVE EQUALIZER

[75] Inventor: Daniel L. Ray, Fair Oaks, Calif.

[73] Assignee: Level One Communications, Inc., Folsom, Calif.

[21] Appl. No.: 612,321

[22] Filed: Nov. 13, 1990

[51] Int. Cl.$^5$ .......................................... H04B 3/14
[52] U.S. Cl. ........................................ 375/12; 333/18; 330/254
[58] Field of Search .............. 375/11, 12, 14, 98; 178/69 R, 69 M; 333/18, 28; 330/277, 278, 279, 283, 302, 254

[56] References Cited

U.S. PATENT DOCUMENTS

| | | | |
|---|---|---|---|
| 3,528,040 | 9/1970 | Galvin | 333/18 |
| 3,568,100 | 2/1971 | Tarbox | 333/28 |
| 3,578,914 | 5/1971 | Simonelli | 333/18 |
| 3,792,356 | 2/1974 | Kobayashi et al. | 375/14 |
| 3,798,576 | 3/1974 | Torpie et al. | 375/14 |
| 3,812,436 | 5/1974 | Fudemoto et al. | 333/18 |
| 3,824,501 | 7/1974 | Harris | 333/18 |
| 4,170,758 | 10/1979 | Tamburelli | 375/12 |
| 4,270,179 | 5/1981 | Sifford et al. | 364/724 |
| 4,283,788 | 8/1981 | Tamburelli | 375/14 |
| 4,306,203 | 12/1981 | Sasaki et al. | 375/103 |
| 4,412,341 | 10/1983 | Gersho et al. | 375/102 |
| 4,468,786 | 8/1984 | Davis | 375/11 |
| 4,494,242 | 1/1985 | Ehrenbard et al. | 375/118 |
| 4,520,489 | 5/1985 | Hogge, Jr. | 375/14 |
| 4,571,731 | 2/1986 | Kinkovsky et al. | 375/103 |
| 4,583,234 | 4/1986 | Ramadan | 375/11 |
| 4,760,596 | 7/1988 | Agrawal et al. | 379/410 |
| 4,789,994 | 12/1988 | Randall et al. | 375/12 |
| 4,833,422 | 5/1989 | Atwell | 330/283 |
| 4,881,044 | 11/1989 | Kinoshita et al. | 330/277 |
| 4,887,278 | 12/1989 | Gupta | 375/12 |
| 4,896,334 | 1/1990 | Sayar | 375/20 |

Primary Examiner—Benedict V. Safourek
Attorney, Agent, or Firm—Merchant, Gould, Smith, Edell, Welter & Schmidt

[57] ABSTRACT

A high frequency receive equalizer for baseband data recovery is disclosed utilizing a frequency selective equalization filter to restore dispersed pulses into a recoverable form. The frequency selective equalization filter has a plurality of independently adjustable stages. Received pulses are passed through an equalization filter whose output is monitored by equalizer feedback control means. The feedback control means adjusts the amount of equalization applied until the amplitude of the equalized pulses reaches a predetermined level.

13 Claims, 6 Drawing Sheets

HIGH FREQUENCY RECEIVE EQUALIZER

FIELD OF THE INVENTION

The present invention relates generally to the field of electronic filters, and in particular, to an equalizer for restoring dispersed pulses in a baseband data receiver with feedback control means for controlling the equalizer gain and frequency response.

DESCRIPTION OF RELATED ART

The technique of using feedback as means for controlling the frequency response of a filter is well known in the art. In a typical receiver, the received signal having been attenuated at high frequencies is restored by passing it through a compensating filter whose gain increases with frequency. A typical prior art receive equalizer accomplishes frequency restoration and response control by modulating current through a non-linear device such as a diode, altering its dynamic resistance. The diode is coupled to a passive frequency selective network such that the frequency response of the network varies in a proportional manner to that of the dynamic resistance of the diode. The wide range of time constants and vastly differing diode resistances prevent this type of equalizer from being realized on a monolithic die.

Another technique used in receive equalizers involves the use of a switched capacitor filter rather than a passive network to effectuate the requisite filtering function. Use of a switched capacitor filter eliminates the need for a non-linear device and allows the receive equalizer to be built entirely on a monolithic die. A limitation on the switched capacitor filter approach is that a sample clock is required having a frequency much higher than the data rate to be processed. Therefore, this technique is not a viable option with high speed data rates.

SUMMARY OF THE INVENTION

A high frequency receive equalizer in a baseband data receiver is disclosed utilizing a frequency selective equalization filter to restore dispersed pulses into a recoverable form. Received pulses are passed through an equalization filter whose output is monitored by equalizer feedback control means. The feedback control means adjusts the amount of equalization applied to the received pulse until the amplitude of the equalized pulses reaches a predetermined level. The equalization filter comprises a plurality of discrete frequency selective transfer functions arranged in a monotonically increasing order. The overall filter transfer function is realized by cascading individual stages so as to produce a product reflecting the desired response.

A first stage is provided having a signal input coupled to received pulses, a control input coupled to the feedback control means for selecting an amount of gain, and an output for providing substantially flat frequency, adjustable coarse gain. A second stage is provided having a signal input coupled to the output of the first stage, a control input coupled to the feedback control means for selecting an amount of frequency selective gain and an output for providing substantially high frequency, adjustable gain. A third stage is provided having an input coupled to the output of the second stage and an output for providing high frequency, fixed attenuation. A fourth stage is provided having a signal input coupled to the output of the third stage, a control input coupled to the feedback control means for selecting an amount of gain and an output for providing substantially flat frequency, adjustable fine gain. The output of the fourth stage acts as the output for the overall equalization filter. The first and fourth stages are implemented with selectable capacitive elements in combination with an operational amplifier to provide flat frequency, adjustable gain. The second stage is implemented with transconductance cells and selectable capacitive elements in combination with an operational amplifier to provide the required selective frequency gain. The third stage is a modified third order elliptic filter implemented as a quasi-ladder structure utilizing transconductance cells in combination with capacitive elements. A comparator is coupled to the output of the equalization filter and to a reference voltage providing an output for indicating whether the output of the equalization filter is larger or smaller than the reference voltage. The equalizer feedback control means monitors the comparator output and controls the flat frequency gain and frequency selective gain of the equalization filter by selecting values for the capacitive elements.

For a better understanding of the invention, as well as other objects and further features thereof, reference is had to the following detailed description of the preferred embodiment taken in conjunction with accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part thereof, and in which it is shown by way of illustration a specific embodiment in which the invention may be practiced. It is to be understood that other embodiments may be utilized and structural changes may be made without departing from the scope of the present invention.

Figure 1:
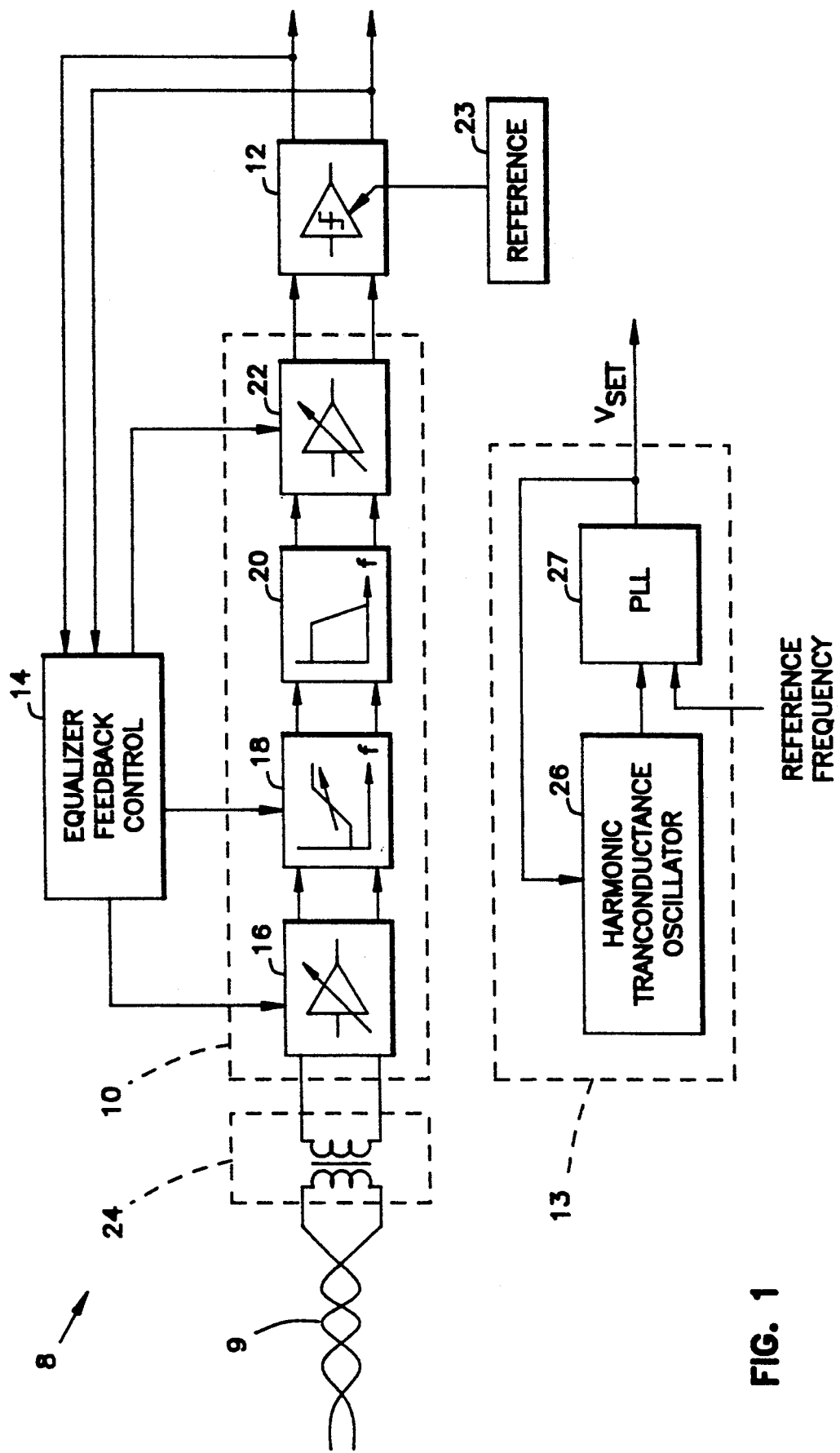
FIG. 1 is a simplified block diagram of a receive equalizer.

Referring now to FIG. 1, a receive equalizer 8 is described for use in a 1.544 Mb/s or 2.048 Mb/s T1 or CEPT transceiver. Those skilled in the art can readily recognize that receive equalizer 8 shown can be easily adapted for use in other high frequency applications. Receive equalizer 8 comprises a continuous time, frequency selective, equalization filter 10 having a plurality of cascaded stages 16–22, a comparator 12, transconductance cell calibration means 13 and equalizer feedback control means 14. The output of comparator 12 provides the overall output for receive equalizer 8 and is coupled to the input of equalizer feedback control means 14. In response to input from comparator 12, equalizer feedback control means 14 controls the gain and frequency response of equalization filter 10.

Transconductance cell calibration means 13 comprises a harmonic transconductance oscillator 26 and a second order, charge-pump phase lock loop (PLL) 27 minimizing ripple on generated reference voltage ($V_{set}$). Reference voltage ($V_{set}$) is used for setting transconductance of the transconductance cells described hereinbelow. Oscillator 26 comprises a first and second transconductance cell connected back-to-back to form an oscillator, and a simple non-linear circuit to limit the oscillation amplitude. In the preferred embodiment, an available 1.544 Mhz clock acts as a reference frequency for the PLL 27.

Equalization filter 10 comprises a first stage 16 for providing substantially flat frequency, adjustable coarse gain, a second stage 18 for providing substantially high frequency, adjustable zeros, a third stage 20 for providing high frequency, fixed attenuation and a fourth stage 22 for providing substantially flat frequency, adjustable fine gain. First stage 16 is coupled to a transmission line 9 through transformer 24. First stage 16 performs a coarse automatic gain control (AGC) function to keep receive equalizer 8 within its linear operating range. Second stage 18 is coupled to the output of first stage 16. It restores high frequency properties in received pulses by providing a plurality of adjustable real zeros in combination with fixed poles. Third stage 20 is a third order elliptic filter with two additional poles coupled to the output of second stage 18. It reduces crosstalk in receive equalizer 8 by providing a steep frequency attenuation profile. The parameters of third stage 20 are optimized to reduce ringing and other intersymbol effects to less than 2% of the total amplitude of the received pulse. Fourth stage 22 is coupled to the output of third stage 20. It provides flat frequency, adjustable fine gain as well as increased output drive to comparator 12. Comparator 12 compares the output of fourth stage 22 to a predetermined reference 23 and provides a digital signal indicating whether the output of fourth stage 22 is above or below the reference 23. The digital signal output of comparator 12 is routed to digital processing circuits in the transceiver and also to equalizer feedback control means 14. Feedback control means 14 adjusts the transfer function of equalization filter 10 to compensate for $\sqrt{f}$ losses of transmission line 9 coupled to transformer 24. Values for adjustable capacitive elements in the first stage 16, second stage 18 and fourth stage 22 of equalization filter 10 are selected such that the peak of output pulse at fourth stage 22 equals the predetermined reference 23 to comparator 12.

Figure 2:
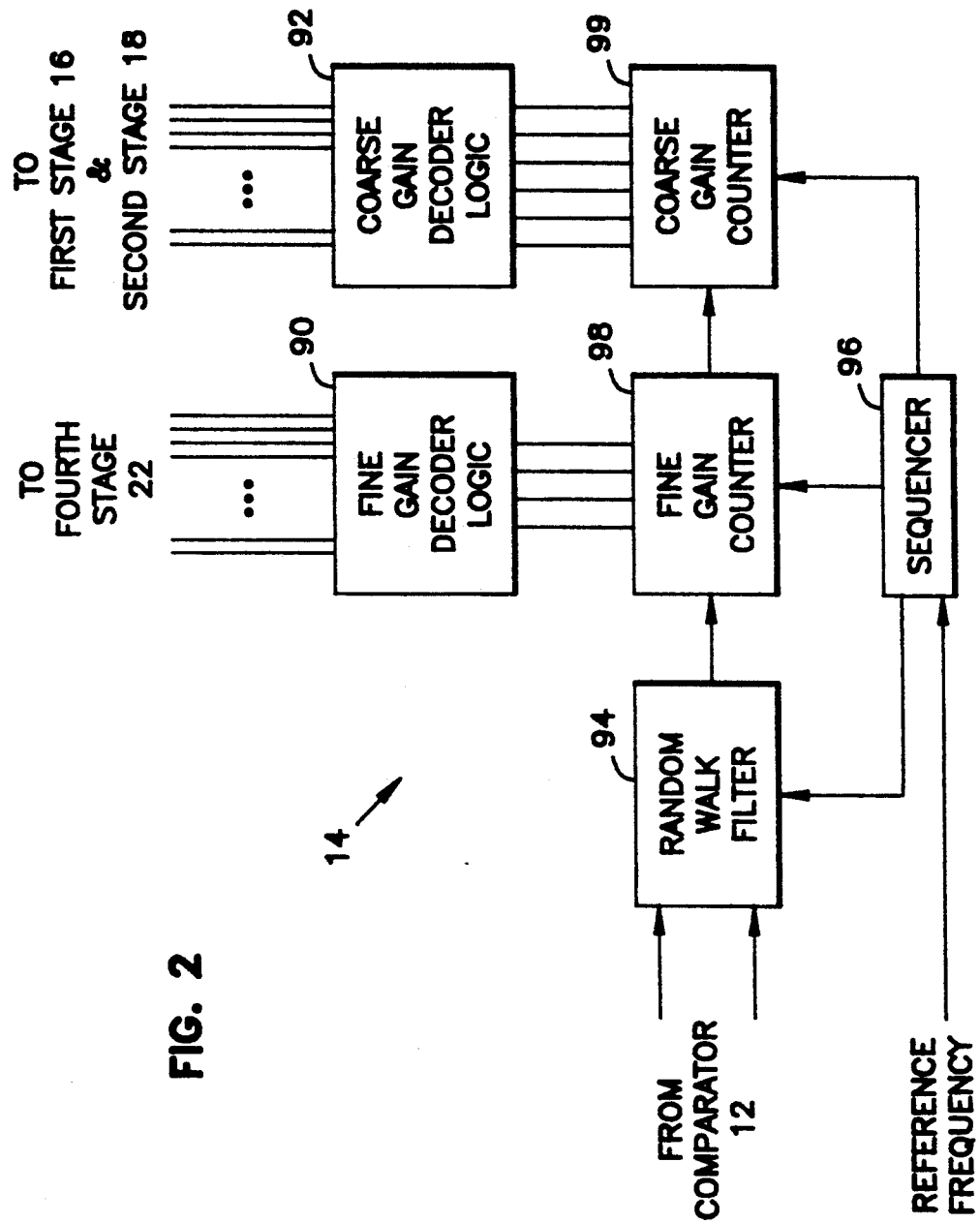
FIG. 2 is a simplified block diagram of equalizer feedback control means.

Referring now to FIG. 2, a block diagram of equalizer feedback control means 14 is illustrated. Random walk filter 94 is coupled to the output of comparator 12. Random walk filter 94 performs an averaging function to prevent dithering between steps when equalization filter 10 has converged to point where one step by feedback control means 14 would be too little gain and a subsequent step would be too much gain. Sequencer 96 sequences random walk filter 94, fine gain counter 98 and coarse gain counter 99 by generating a synchronized system clock derived from the 1.544 Mhz reference 23 clock. The output of random walk filter 94 in conjunction with sequencer 96, causes fine gain counter 98 and coarse gain counter 99 to increment or decrement depending upon whether the fourth stage 22 output is greater than or less than the predetermined reference. If the output of comparator 12 indicates that the fourth stage 22 output is greater than the reference 23, equalization filter 10 has too much gain. Counters 98 and 99 then cause decoder logic 90 and 92 respectively, to sequentially switch out capacitance in first stage 16, second stage 18 and fourth stage 22 such that the frequencies at which zeroes occur increase and flat gain decreases while maintaining a predetermined zero frequency to flat gain ratio. If comparator 12 indicates that the fourth stage 22 output is less than the reference 23, equalization filter 10 has insufficient gain. Counters 98 and 99 then cause decoder logic 90 and 92 respectively, to sequentially switch in capacitance such that frequencies at which zeros occur decease and flat gain increases while maintaining a predetermined zero frequency to flat gain ratio. Capacitive elements in first stage 16, second stage 18 and fourth stage 22 of equalization filter 10 are constructed as a logarithmically weighted array of capacitors. The logarithmic relationship provides for a constant change in gain for each incremental step by decoder logic 90 and 92. In the preferred embodiment, there are twenty-one steps of flat gain and forty-three steps of zero placements. Those skilled in the art can readily recognize that the number of steps can be easily increased by extending the length of counters 98 and 99. Fourth stage 22 induces hysteresis in the gain and zero frequency adjustment of feedback control means 14 by providing a full-scale range 1.5 times larger than the incremental step sizes of first stage 16 and second stage 18. The induced hysteresis prevents dithering between two coarse steps by furnishing sufficient overlap with the fine gain adjustment range of fourth stage 22.

Figure 7A:
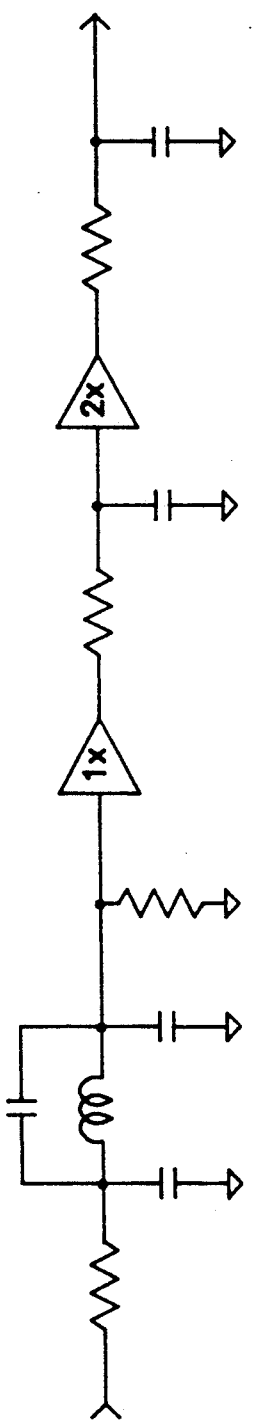
FIG. 7A is a prior art RLC type filter implementation of a crosstalk filter.
Figure 7B:
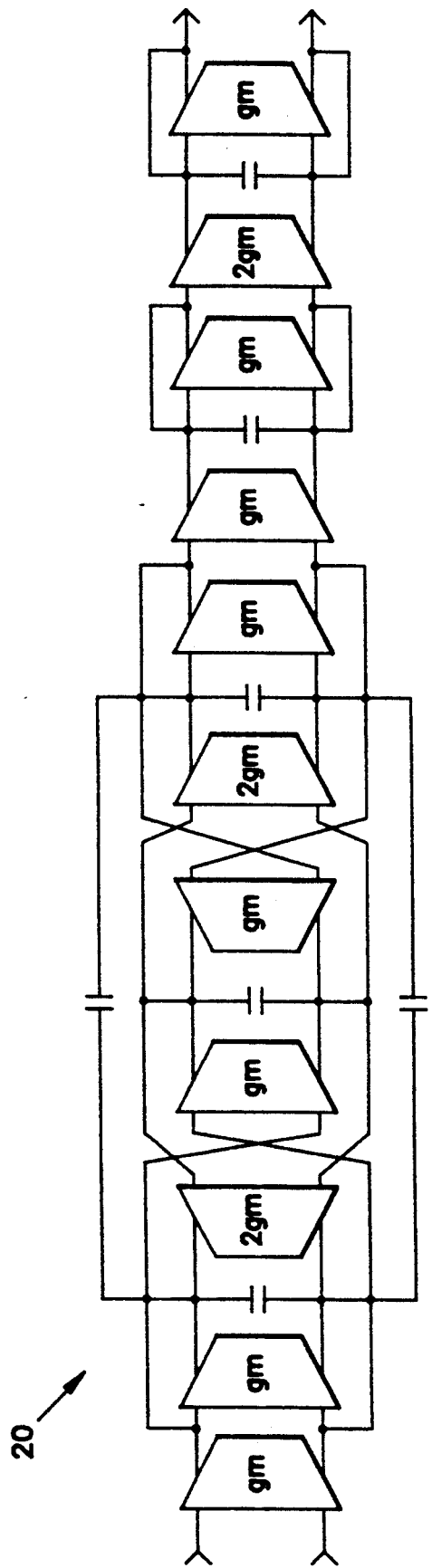
FIG. 7B is a implementation of the crosstalk filter utilizing transconductance cells in combination with capacitive elements.

Referring now to FIG. 7A, a prior art RLC type filter for reducing crosstalk is illustrated. The RLC type filter implements the elliptic filtering function with additional poles of third stage 20. FIG. 7B illustrates that in the present invention, a quasi-ladder structure utilizing a plurality of transconductance cells in combination with capacitive elements emulates the RLC type crosstalk filter in FIG. 7A.

Figure 3:
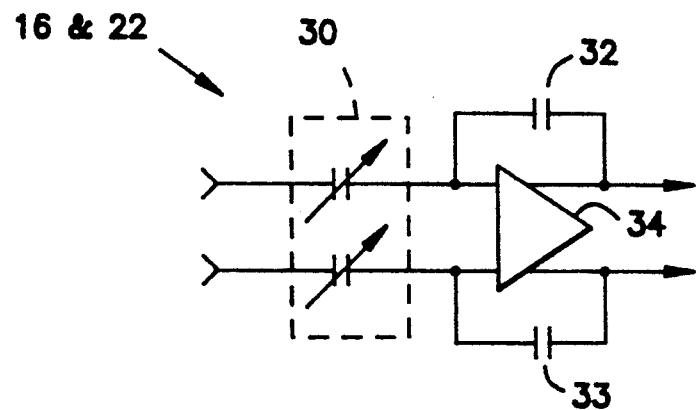
FIG. 3 is a simplified schematic diagram illustrating a flat frequency, adjustable gain active filter.

Referring now to FIG. 3 an active filter implementation of first stage 16 and fourth stage 22 is schematically illustrated. Flat frequency gain of first stage 16 and fourth stage 22 is adjusted by equalizer feedback control means 14 by selection of capacitors in capacitive array 30. The change in capacitance in capacitive array 30 with respect to fixed capacitors 32 and 33 causes the flat frequency gain of first stage 16 and fourth stage 22 to change.

Figure 4:
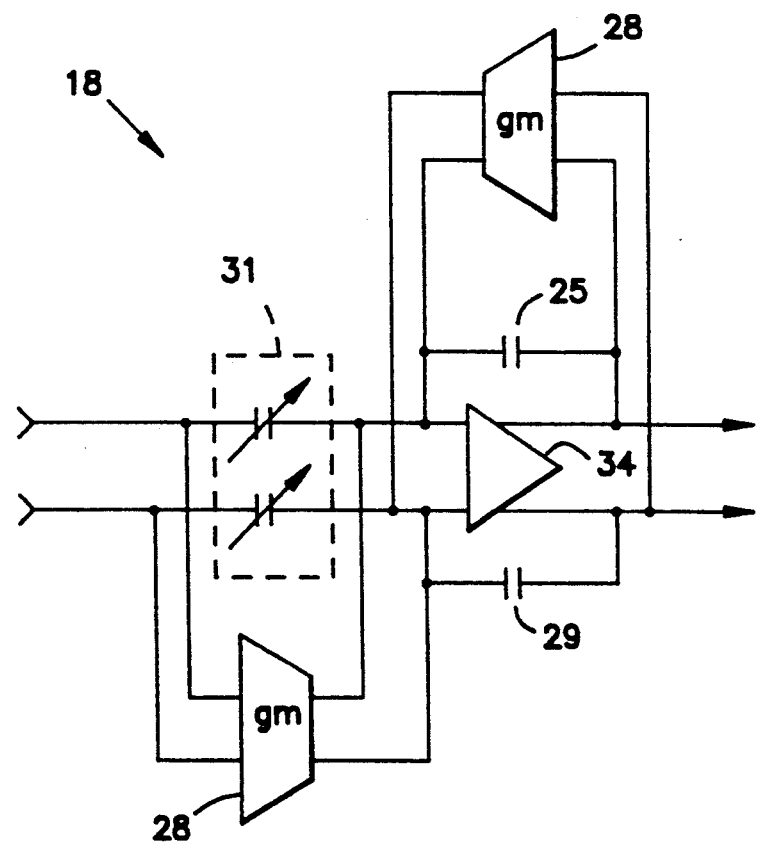
FIG. 4 is a simplified schematic diagram illustrating a substantially high frequency, adjustable zero active filter.

FIG. 4 illustrates an active filter implementation of second stage 18. Frequencies at which zeros occur in second stage 18 are adjusted by equalizer feedback control means 14 adjusts by selection of capacitors in capacitive array 31. The change in capacitance in capacitive array 31 with respect to fixed capacitors 25 and 29 and a first transconductance cell 28 and a second transconductance cell 28 causes the zeros of second stage 18 to change. Although FIG. 4 exemplifies a second order, high frequency zero filter, those skilled in the art can readily recognize that the order of the filter can be easily extended with additional components.

Figure 5:
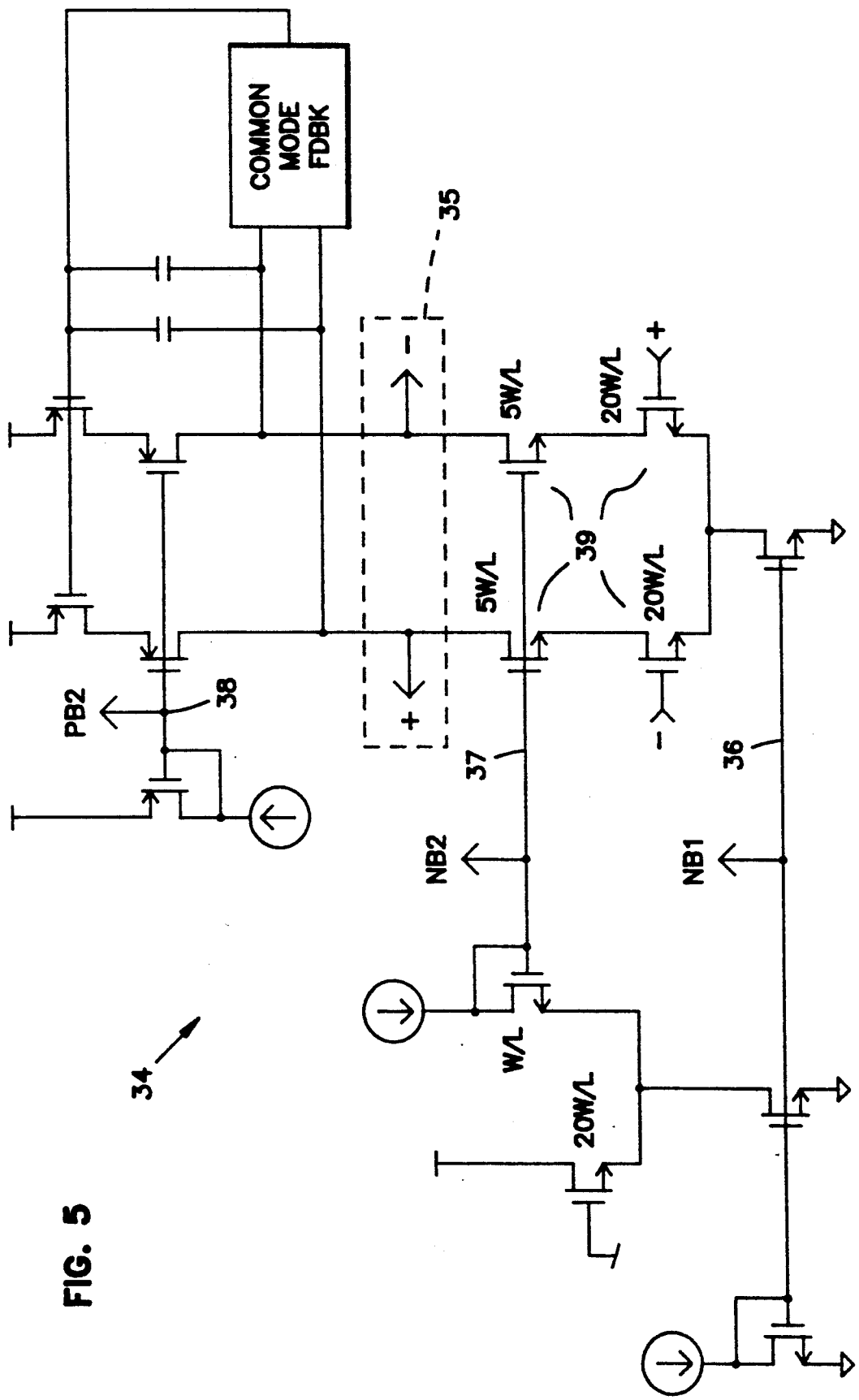
FIG. 5 is a simplified schematic diagram illustrating the topology of a high gain-bandwidth product operational amplifier for use in an active filter.

Referring now to FIG. 5, the topology of operational amplifier 34 used in first stage 16, second stage 18, and fourth stage 22 is illustrated. A "telescopic" cascode structure having high swing, cascode biasing at biasing nodes 36, 37, and 38 provides for a 2.5 Vp-p differential output at node 35. The telescopic cascode structure compares favorably against a typical folded cascode structure, as a non-dominant pole is created by N-channel devices 39 rather than P-channel devices. N-channel devices 39 have a higher transconductance to capacitance ratio than P-channel devices. The higher ratio combined with reduced junction capacitance on the cascode source, pushes the non-dominant pole out by a factor of two or more. At the expense of reduced dynamic range, the telescopic topology uses less power for a given gainbandwidth than a folded cascode topology.

Figure 6:
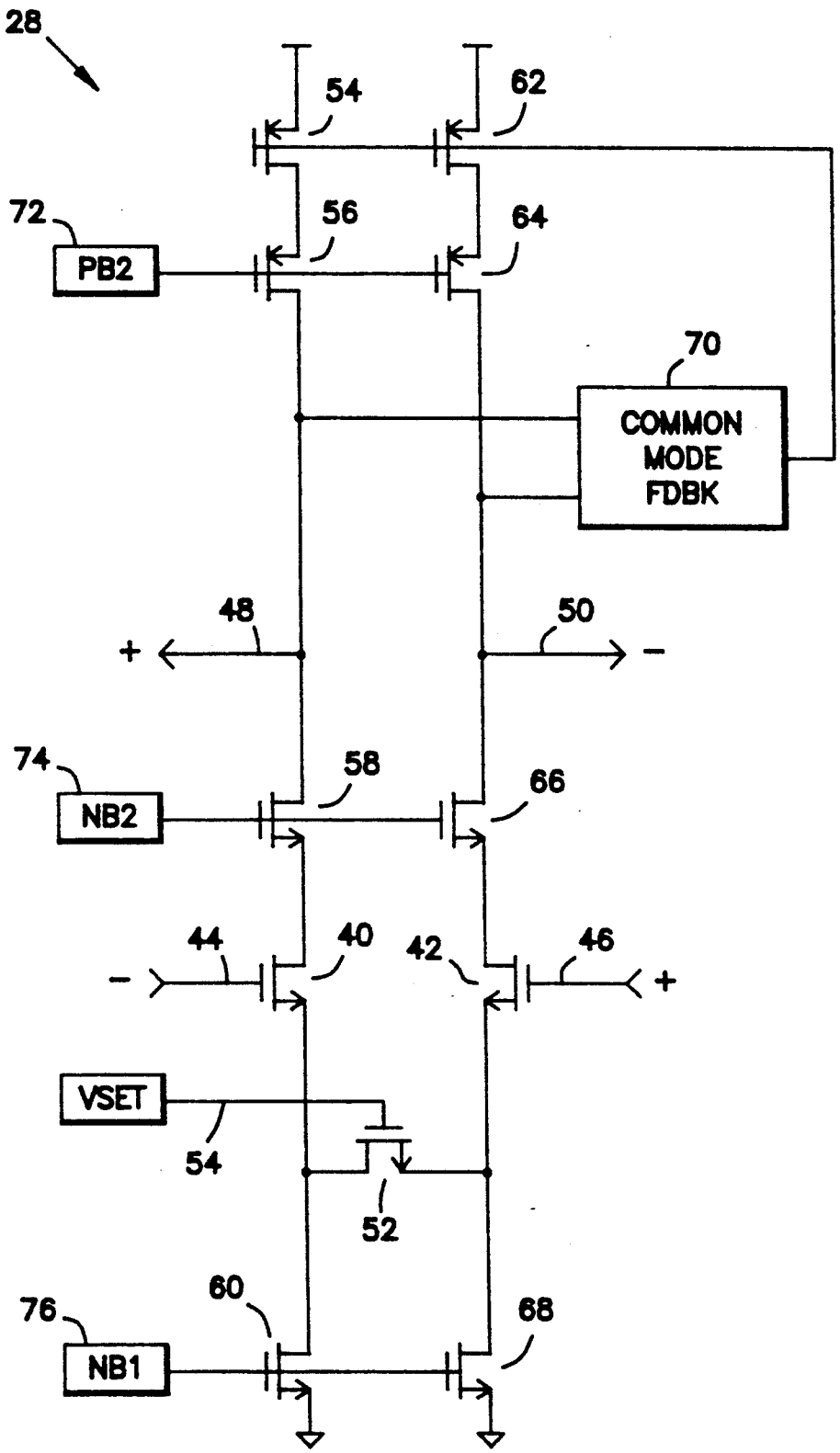
FIG. 6 is a simplified schematic diagram illustrating a transconductance cell used within the receive equalizer to provide a linear voltage to current conversion.

Referring now to FIG. 6, a schematic diagram illustrates a transconductance cell 28 used within receive equalizer 8 to provide linear voltage to current conversion. Transconductance cell 28 comprises a first MOS transistor 40 and a second MOS transistor 42 each having a gate, a drain and a source. The gate of first MOS transistor 40 acts as the negative input 44 and the gate of second MOS transistor 42 acts as the positive input 46 of the overall differential cell input. Transistors 54, 56, 58, 60 and transistors 62, 64, 66, 68 are controlled by common mode feedback 70 and bias current control voltages 72, 74, 76 respectively providing bias and reduced output conductance for the cell. The drain of first MOS transistor 40 is coupled to the positive output 48 of the cell differential output. The drain of second MOS transistor 42 is coupled to the negative output 50 of the cell differential output. The source of first MOS transistor 40 and second MOS transistor 42 are coupled together as a degenerated source-coupled pair by a third MOS transistor 52. The gate of third transistor 52 acts as a control input 54 for adjustment of the overall transconductance of transconductance cell 28. Control input 54 is connected to the reference voltage ($V_{set}$) generated by transconductance cell calibration means 13.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A receive equalizer for restoring dispersed data pulses into a recoverable form, comprising:
   (a) an active filter having a single input for receiving the data pulses, a signal output and a control input;
   (b) a digital comparator, having a first input coupled to the signal output of the active filter and a second input coupled to a reference voltage, for comparing the signal output to the reference voltage, wherein the comparator provides a digital output indicating results of the comparison; and
   (c) feedback control means, having an input coupled to the digital output of the comparator and an output coupled to the control input of the active filter, for controlling capacitance values in the filter in response to the digital output of the comparator, wherein the feedback control means adjusts the filter gain and frequency selectivity in discrete steps until the signal output reaches a predetermined level.

2. The equalizer of claim 1, wherein the feedback control means comprises:
   (1) a random walk filter, having an input coupled to the output of the comparator and an output, for preventing dithering between steps when the equalizer has converged to a point where one step by the random walk filter would cause too little gain and a subsequent step would cause too much gain;
   (2) a sequencer, having an input coupled to a reference frequency clock and an output coupled to the output of the random walk filter, for sequencing the random walk filter; and
   (3) gain counter means, having an first input coupled to the output of the random walk filter, a second input coupled to the output of the sequencer for synchronization to a system clock, and an output coupled to the control input of the active filter, for switching capacitance within the active filter.

3. The equalizer of claim 2, wherein the feedback control means further comprising means for adjusting the gain and frequency selectivity of the active filter to approximate an inverse transfer function of a transmission line over which the received data pulses traverse.

4. The equalizer of claim 3, wherein the transmission line is a twisted pair cable.

5. The equalizer of claim 1, wherein the active filter comprises a plurality of individually adjustable discrete stages, wherein the stages are arranged in a monotonically increasing order.

6. The equalizer of claim 5, wherein the plurality of individually adjustable discrete transfer functions comprises:
   (i) a first stage having a differential input for coupling to the received data pulse and a differential output, the first stage providing a first transfer function having substantially flat frequency, adjustable coarse gain;
   (ii) a second stage having a differential input and a differential output, the second stage input being coupled to the first stage output and providing a second transfer function having high frequency, adjustable zeros;
   (iii) a third stage having a differential input and a differential output, the third stage input being coupled to the second stage output and providing a third transfer function having fixed high frequency attenuation; and
   (iv) a fourth stage having a differential input and a differential output, the fourth stage input being coupled to the third stage output, the fourth stage output being coupled to the comparator and providing an equalized data pulse, wherein the fourth stage provides a fourth transfer function having substantially flat frequency, adjustable fine gain.

7. The equalizer of claim 6, wherein the third stage comprises a plurality of transconductance cells and a plurality of capacitive elements arranged as a quasi-ladder structure.

8. The equalizer of claim 7, wherein each of the plurality of transconductance cells comprises:
   (a) a first MOS transistor having a first gate, a first drain and a first source;

(b) a second MOS transistor having a second gate, a second drain and a second source, wherein the first and second gates are coupled as a differential input, and the first and second drains are coupled as a differential output;

(c) a third MOS transistor having a third gate, a third drain coupled to the first source and a third source coupled to the second source, wherein the first and second MOS are coupled as a degenerated source-coupled pair, and the third gate is coupled as a control input for adjusting transconductance of the device; and (d) a plurality of MOS transistors for reducing output conductance, wherein the MOS transistors are coupled in a cascode fashion between the differential output and the first and second drains.

9. The equalizer of claim 8, wherein each of the plurality of transconductance cells further comprises calibration means, connected to the control input, for setting the transconductance of the device.

10. The equalizer of claim 6, wherein the second stage comprises at least one adjustable capacitive element, at least one fixed capacitive element, at least one transconductance cell and a high frequency operational amplifier, arranged as an active filter having at least one adjustable zero in combination with at least one fixed pole.

11. The equalizer of claim 10, wherein the adjustable capacitive element comprises a switchable array of capacitors having a logarithmically increasing capacitance ratio.

12. The equalizer of claim 6, wherein the first and fourth stages each comprise at least one adjustable capacitive element, at least one fixed capacitive element and a high frequency operational amplifier, arranged as a flat frequency, adjustable gain, active filter.

13. A method for restoring a dispersed received pulse into a recoverable form in a baseband data recovery receiver, comprising the steps of:

(a) providing gain enhancement with flat frequency gain and frequency selective gain to the received pulse, the flat frequency gain and frequency selective gain having discrete switchable capacitive elements;

(b) monitoring the gain enhanced received pulse for amplitude variations; and (c) adjusting the flat frequency gain and the frequency selective gain in step (a) by switching the capacitive elements in and out until the gain enhanced received pulse amplitude reaches a predetermined level.

* * * * *